J. COYLE.
CAN SOLDERING MACHINE.
APPLICATION FILED MAY 25, 1909.
962,944.
Patented June 28, 1910.
3 SHEETS—SHEET 1.
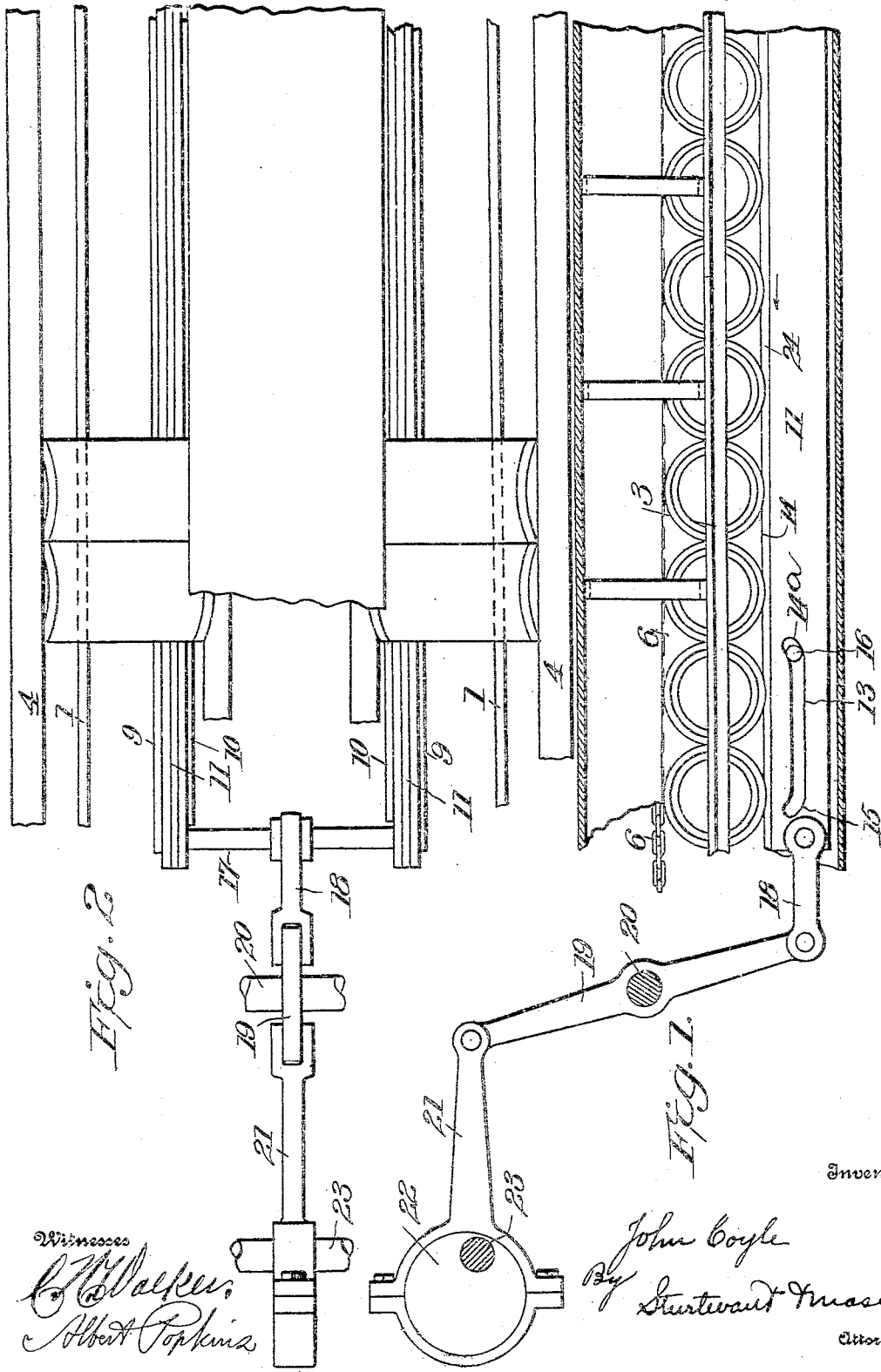

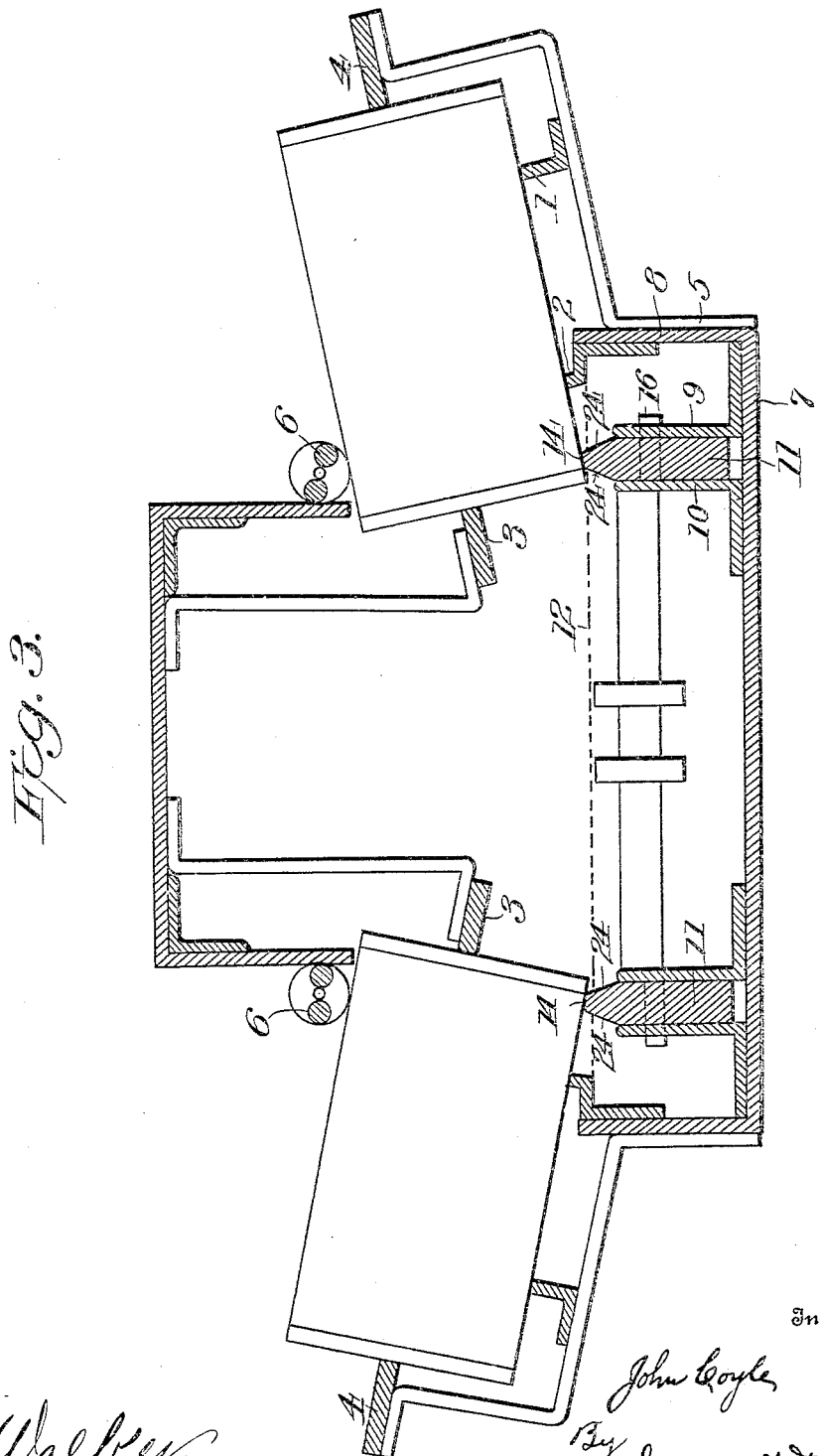

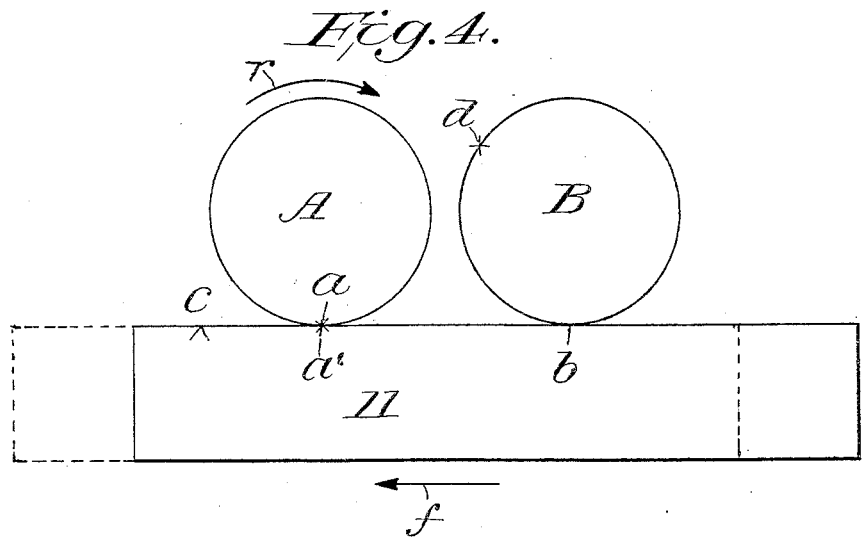
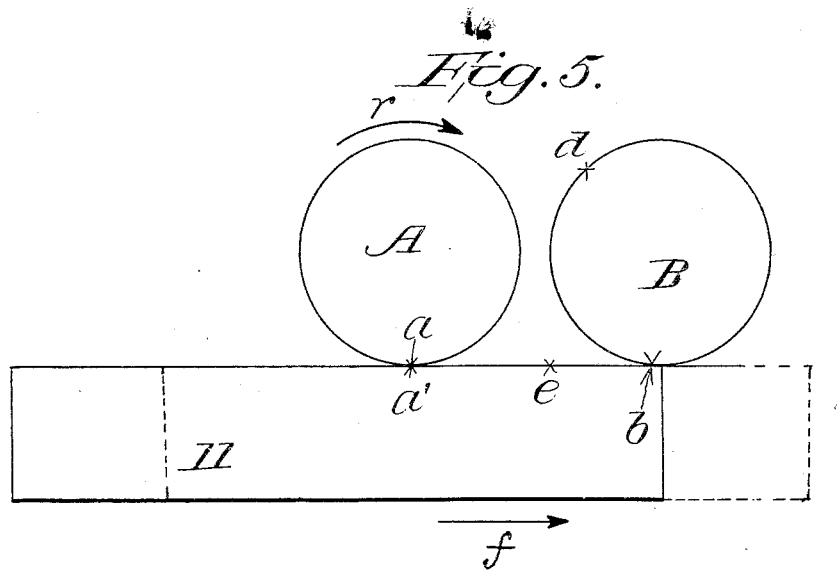

UNITED STATES PATENT OFFICE.

JOHN COYLE, OF BALTIMORE, MARYLAND, ASSIGNOR TO CONTINENTAL CAN CO., OF BALTIMORE, MARYLAND, A CORPORATION OF NEW JERSEY.

CAN-SOLDERING MACHINE.

962,944.  Specification of Letters Patent.  Patented June 28, 1910.

Application filed May 25, 1909. Serial No. 498,155.

*To all whom it may concern:*

Be it known that I, JOHN COYLE, a citizen of the United States, residing at Baltimore, in the State of Maryland, have invented certain new and useful Improvements in Can-Soldering Machines, of which the following is a description, reference being had to the accompanying drawing, and to the letters and figures of reference marked thereon.

The invention relates to new and useful improvements in can soldering machines, and more especially end seaming machines where the end of the can is conveyed to the soldering iron and is rotated in contact with the iron.

An object of the invention, is to provide a soldering machine with a soldering iron which is supplied with solder and which iron is given a relative endwise movement, while the can is in rolling contact therewith, so as to cause a sliding contact between the can and the iron.

A further object of the invention, is to provide a soldering machine with a solder bath and a soldering iron which is so constructed and operated that the iron is immersed in the solder bath for the purpose of charging the iron with solder, and then raised out of the bath for the purpose of supplying the solder to the cans.

These and other objects, will in part be obvious, and will in part be hereinafter, more fully described.

In the drawings which show by way of illustration one embodiment of the invention; Figure 1 is a side view of a portion of the machine, having my improved soldering mechanism applied thereto. Fig. 2 is a top plan view of the same. Fig. 3 is a sectional view through the machine. Fig. 4 is a diagrammatic view showing the movement of the iron in one direction, while in contact with the can. Fig. 5 is a similar view showing the movement of the iron in the opposite direction.

The can soldering machine as herein shown is provided with the usual run way for the cans, which consists of supporting rails 1, 2, and side guiding rails 3, 4. The side rail 4 and the supporting rail 1, are carried by a suitable bracket arm 5. The can is carried along the run way as herein shown by a chain feed 6, (see Figs. 1 and 3). These parts are of the usual construction and form no part of the present invention and are herein shown merely for the purpose of illustration. It is obvious that in place of the chain feed, any suitable feeding mechanism may be substituted therefor, the essential feature being that the cans are conveyed one after another to the soldering iron, and are rotated or rolled along said iron.

I have provided a solder bath which as herein shown, consists of a bottom portion 7 and side portions 8. Within the bath I have provided brackets 9 and 10, between which is guided my improved soldering iron 11. The soldering iron 11 as herein shown, is a comparatively narrow, long, iron which is of such width that it may be dropped below the surface of the solder in the bath, which is indicated by the line 12. The iron at each end is slotted as indicated at 13. Said slot throughout the greater portion of its length is parallel with the contact face 14 of the iron. The slot at one end is deflected upwardly as shown at 14$^a$, and at its other end is also deflected upwardly as indicated at 15. A supporting pin 16 is carried by the brackets 9 and 10 and extends through the slot 13 in the iron 11. There is a similar slot in each end of the iron so that the iron rests on the pins 16. The slot 13 is so shaped that when the pin 16 is in the long straight portion, the contacting face of the iron 14 or soldering face is raised above the surface of the solder in the bath. When the pin 16 is at either extreme end of the slot, that is, in the portions 14$^a$ or 15, the soldering face of the iron will be dropped beneath the surface of the solder, and the iron entirely immersed in the solder bath. If the iron is reciprocated from one end of the slot to the other, it will readily be seen that the iron will move quickly from beneath the surface of the solder, to its extreme upper position and that it will remain in this extreme upper position while it is being reciprocated, until the other extreme end of the slot is reached, when the iron will quickly drop beneath the surface of the solder, and by a reciprocation of the iron in the reverse direction, said iron will quickly be raised again from the solder bath charged with solder, for applying the same to the can.

As a means for reciprocating the iron, I have shown the two irons at each side of the machine, which are located in the same bath as connected by a cross bar 17 to which is pivotally secured a link 18. A lever 19 is fulcrumed at 20 on the frame of the machine, and at its lower end, is pivoted to the link 18. At its upper end, the lever 19 is pivoted to an eccentric strap 21, coöperating with an eccentric 22 on the cross shaft of the machine. As the eccentric rotates, the iron 11 will therefore be moved back and forth or reciprocated in the bath by the swinging movement of the lever 19. The upper face of the iron 11, has its side edges tapered as at 24 so as to provide a comparatively narrow soldering face 14. The width of this face of the soldering iron, determines the amount of solder which is lifted from the bath and presented to the cans.

As the cans pass through the machine, moving in the direction of the arrow, Fig. 1, said cans will roll on the guiding rails 1 and 2. When the soldering iron is in its extreme lower position, that is, immersed in the bath, the rail 2 supports the inner end of the can. When the soldering iron is reciprocated so as to be raised from the bath, said iron will engage a number of cans lifting the same if necessary, from the supporting rail 2, so as to make proper contact with the end seam of the cans. The cans will be caused to roll along the iron by the feed chain which engages the upper faces of the can.

The effect of reciprocating the iron while in contact with the can, is best illustrated in Figs. 4 and 5. When a can is in the position indicated at A, Fig. 4, the point $a$ of the can contacts with the point $a'$ of the iron 11. The can is moving in the direction of the arrow $r$ and when the can is moved to the position B, the initial point of contact of the end seam $a$ has moved around to the point indicated at $d$. The can now makes contact with the iron at the point $b$. While the can is moving from the position A to the position B, the iron has moved in the direction of the arrow $f$ to the dotted position and the point $a'$ of initial contact between the can and the iron, has moved to the position indicated by $c$. The extent of surface of the iron therefore, brought into contact with the can while said can moves from the position A to the position B, is from $b$ to $c$, which is considerably greater than the extent of actual contact on the end seam, which is from $b$ around to $d$. Inasmuch as the extent of contact on the iron is greater than that on the end seam, there has necessarily been a constant sliding contact between the can and the iron, as one is moved faster than the other.

In Fig. 5, I have shown the iron 11 as moving in the opposite direction while in contact with the can, as indicated by the arrow $f$. In this figure, the can moves from the position A to the position B and when the can is in the position A, the contact of the can with the iron is indicated at $a$, and the point of contact of the iron with the can is indicated at $a'$. In moving to the position B, the point of contact with the iron 11 moves around to the point $d$, and the can in this position contacts with the iron at the point $b$. While the can is moving from the position A to the position B, the point $a'$ of initial contact on the iron, moves to the position $e$, so that the actual surface of the iron 11 brought into contact with the can, is from $b$ to $e$, which is considerably less than the extent of the end seam covered by solder which is from $b$ to $d$. It will be seen therefore, that there must be a sliding contact in addition to the rolling contact between the end iron and the can. This sliding contact between the iron and the can in addition to the rolling movement of the can, causes the solder to be applied much more efficiently to the end seam and furthermore, aids in keeping the iron clean, so it will properly convey the solder to the seam. The intermittent immersing of the iron in the solder bath also avoids oxidation of the solder and aids in securing a clean soldering surface.

The solder bath may be heated in any of the well known ways in this art, and inasmuch as the iron is either partly or wholly immersed in the solder bath, said iron will be heated uniformly by the solder bath.

While I have herein shown and described a cam slot for moving the iron into and out of the solder bath, it will be obvious that any suitable means may be employed for that herein shown, for accomplishing this purpose, the essential features being that the iron which has a long surface on which the can may roll may be intermittently and quickly immersed in the solder bath so as to be charged with solder and that the iron may be moved end-wise while in contact with the cans, so as to aid in supplying the solder to the end seams. It will be obvious also that from certain aspects of the invention, I may merely move the iron up and down so as to immerse the same in the solder and after the iron has been charged with solder, raise it into position so that it will make contact with the end of the can.

Having thus particularly described my invention, what I claim as new and desire to secure by Letters Patent is:

1. In a can soldering machine, the combination of a soldering iron on which cans may rest and be rolled, means for conveying the cans to said iron and rolling the end seam in contact therewith, and means for moving the iron endwise, while the can is rolling thereon whereby the iron has a sliding contact with the end seam.

2. In a soldering machine, the combination of a soldering iron, means for conveying the cans to said iron and rotating the end seam in contact therewith, a solder bath, means for moving the soldering iron endwise while the can is rolling thereon, whereby the can has a sliding contact with the end seam, and means for moving the soldering face of said iron into and out of said bath.

3. In a can soldering machine, the combination of a soldering iron, means for conveying the cans to said iron and for rotating the end seam in contact therewith, a solder bath, means for moving the soldering face of said iron into and out of said bath, and for moving the iron endwise while out of the bath and in contact with the can.

4. In a can soldering machine, the combination of a soldering iron, means for conveying cans to said iron and rotating the end seam in contact therewith, a solder bath, means for reciprocating the iron while in contact with the can and means for causing the iron during its reciprocation to be immersed in the solder bath.

5. In a can soldering machine, the combination of a soldering iron, means for conveying the cans to said iron, and rotating the end seam in contact therewith, a solder bath, means for moving the iron bodily so that the soldering face thereof is moved into and out of said bath.

6. In a can soldering machine, the combination of a soldering iron, means for conveying the cans to said iron and for rotating the end seam in contact therewith, a solder bath, means for reciprocating said iron longitudinally and means coöperating therewith, for intermittently immersing the iron beneath the surface of the solder in the bath.

7. In a can soldering machine, the combination of a soldering iron, means for conveying the cans to said iron and rotating the end seam in contact therewith, a solder bath, brackets located in said bath for guiding said iron, means for reciprocating said iron between said brackets and means for intermittently causing said iron to move beneath the surface of the solder in the bath.

8. In a can soldering machine, the combination of a soldering iron, means for conveying the cans to said iron and rotating the end seam in contact therewith, a solder bath, brackets located in said bath for guiding said iron, means for reciprocating said iron between said brackets, said iron having a cam slot therein and a guiding pin carried by said brackets and located in said slot, for moving the soldering face of said iron into and out of the bath.

9. In a can soldering machine, the combination of a soldering iron, means for conveying the cans to said iron and rotating the end seam in contact therewith, a solder bath, a link connected to the end of said iron, a lever connected to said link, means for vibrating said lever for reciprocating said iron, brackets for guiding the movement of said iron, a pin carried by said brackets, said iron having a slot engaging said pin, said slot having a straight portion parallel with the soldering face of the iron and the ends of said slot being deflected upwardly whereby the iron will be reciprocated with its soldering face normally above the solder in the bath and will be intermittently and quickly immersed beneath the solder in said bath.

10. In a can soldering machine, the combination of a soldering iron having a substantially straight face, means for conveying cans to said iron and rotating the end seam along said iron and in contact therewith, a solder bath, and means for bodily raising and lowering the iron into and out of said bath to cause the iron to be charged with solder, and to be brought into contact with the end seam of the can.

In testimony whereof I affix my signature, in presence of two witnesses.

JOHN COYLE.

Witnesses:
　DANIEL P. ROBINSON,
　JOHN W. HEWES.